US009348932B2

(12) United States Patent
Pemrick et al.

(10) Patent No.: US 9,348,932 B2
(45) Date of Patent: May 24, 2016

(54) METHOD AND APPARATUS FOR REDIRECTING WEBPAGE REQUESTS TO APPROPRIATE EQUIVALENTS (75) Inventors: Scott Pemrick, Reading, PA (US); Jeffrey Papst, Reading, PA (US)

(73) Assignee: PENSKE TRUCK LEASING CO., L.P., Reading, PA (US)

(*) Notice: Subject to any disclaimer, the term of this patent is extended or adjusted under 35 U.S.C. 154(b) by 560 days.

(21) Appl. No.: 13/459,756

(22) Filed: Apr. 30, 2012

(65) Prior Publication Data
US 2013/0290515 A1  Oct. 31, 2013

(51) Int. Cl.
G06F 17/30 (2006.01)
(52) U.S. Cl.
CPC ...... *G06F 17/3089* (2013.01); *G06F 17/30905* (2013.01)
(58) Field of Classification Search
CPC ..................... G06F 17/30905; G06F 17/3089
USPC ................................................. 709/224, 225
See application file for complete search history.

(56) References Cited

U.S. PATENT DOCUMENTS

| | | | | |
|---|---|---|---|---|
| 7,627,648 B1* | 12/2009 | Mehta et al. | | 709/217 |
| 8,526,405 B2* | 9/2013 | Curtis et al. | | 370/338 |
| 2002/0143822 A1* | 10/2002 | Brid et al. | | 707/522 |
| 2003/0037108 A1* | 2/2003 | Peiffer et al. | | 709/203 |
| 2003/0061387 A1* | 3/2003 | Brown et al. | | 709/246 |
| 2004/0148565 A1* | 7/2004 | Davis | | G06F 17/3089 715/205 |
| 2007/0162543 A1* | 7/2007 | Huang et al. | | 709/203 |
| 2008/0242284 A1* | 10/2008 | Vechey et al. | | 455/415 |
| 2009/0119329 A1* | 5/2009 | Kwon et al. | | 707/102 |
| 2010/0042742 A1* | 2/2010 | Christianson et al. | | 709/238 |
| 2011/0131085 A1* | 6/2011 | Wey | | 705/14.16 |
| 2012/0215621 A1* | 8/2012 | Heffernan et al. | | 705/14.41 |
| 2012/0254402 A1* | 10/2012 | Panidepu et al. | | 709/224 |
| 2013/0031120 A1* | 1/2013 | Passani et al. | | 707/758 |
| 2013/0073388 A1* | 3/2013 | Heath | | 705/14.53 |
| 2013/0080498 A1* | 3/2013 | Desilva et al. | | 709/201 |
| 2013/0097488 A1* | 4/2013 | Coman et al. | | 715/243 |

* cited by examiner

*Primary Examiner* — Joe Chacko
(74) *Attorney, Agent, or Firm* — Drinker Biddle & Reath LLP (57) ABSTRACT

Apparatuses, methods, and computer readable medium, for redirecting a webpage request for a webpage to a webpage request for a more compatible webpage, the method including receiving the webpage request from a user device for the webpage, determining whether a cookie exists for the user device, and if the cookie does not exist, then modifying the received request for the webpage to include a type of the user device, wherein the cookie indicates the type of the user device; retrieving instructions from the requested webpage; and sending a response to the user device to redirect to the more compatible webpage if the type of the user device indicates the user device is more compatible with the more compatible webpage, wherein the sending the response is based on the instructions retrieved from the requested webpage.

36 Claims, 3 Drawing Sheets

METHOD AND APPARATUS FOR REDIRECTING WEBPAGE REQUESTS TO APPROPRIATE EQUIVALENTS

FIELD

The present disclosure relates to methods and apparatuses for redirecting webpage requests, and more specifically to redirecting webpage request for a webpage designed for a first type of user device to a webpage designed for a second type of user device.

BACKGROUND

In the discussion of the background that follows, reference is made to certain structures and methods. However, the following references should not be construed as an admission that these structures and methods constitute prior art. Applicants expressly reserve the right to demonstrate that such structures and methods did not qualify as prior art.

Devices such as desktop computers, tablet computers, and mobile devices sometimes require different webpage designs for presenting the same or similar content. The smaller screen and more limited input and output provided by the mobile devices compared with desktop devices often require designers of webpages to design a webpage both for a desktop device and a corresponding page for mobile devices. The webpage designers may even design a webpage separately for tablet computers to take advantage of qualities provided by the tablet computers.

Meanwhile, search engines crawl the Internet to provide search results to users of desktop and mobile devices. Sometimes a user of one type of device will select a page presented by a search engine that was designed for a different type of device. The result can be that the webpage is displayed on the user device in a manner that is less than optimal for the user device. The owner of the webpage may be a business that may be concerned that a negative impression of their company may be associated with the presentation of a webpage in less than an optimal fashion. Additionally, the owner of the webpage may be concerned that a potential customer may not patronage their company because the customer selected a webpage from search results that was not designed for their type of device. For example, a potential customer using a mobile device such as a smart phone may select a webpage from search results that was meant for a desktop or laptop computer. The selected webpage may be presented on the smart phone in such a way that the potential customer cannot read the text or make appropriate selections among options presented to the potential customer. The potential customer may become frustrated and decide to patronage another company's webpage.

SUMMARY

Therefore, there is a need in the art for an apparatus, computer readable medium, and method for redirecting a webpage request for a webpage designed for a first type of user device to a webpage request for a corresponding webpage designed for a second type of user device, the method including receiving the webpage request from a user device for the webpage designed for the first type of user device; determining whether a device_checked cookie exists for the user device, and if the device_checked cookie does not exist, then modifying the received request for the webpage designed for the first type of user device to include a type of the user device, wherein the device_checked cookie indicates the type of the user device; retrieving instructions from the webpage designed for the first user device; and sending a response to the user device to redirect to the webpage designed for the second type of device if the type of the user device indicates the user device is more compatible with the webpage designed for the second type of device, wherein the sending the response is based on the instructions retrieved from the webpage designed for first user device.

The retrieved instructions from the webpage designed for the first user device may include instructions to send a response to the user device to redirect to the webpage designed for the second type of user device if the type of the user device indicates the user device is more compatible with the webpage designed for the second type of user device.

Sending a response may include sending a response to the user device to redirect to the webpage designed for the second type of user device if the type of the user device indicates the user device is more compatible with the webpage designed for the second type of device, and if a user of the user device has not indicated a preference for the webpage designed for the first type of user device.

The first user device, the second user device, and the type of the user device may be at least one of: a desktop computer, a laptop computer, a tablet computer, and a mobile device.

Modifying the request may include determining the type of the user device; and modifying the request for the webpage designed for the first type of user device to include the type of the user device.

Determining the type of the user device may include sending a request to a webserver for the type of the user device; and receiving a response from the webserver comprising the type of the user device.

The method may include after the step of receiving the response from the webserver: storing the received type of the user device; resending the request for the webpage designed for the first type of user device; receiving the resent request for the webpage designed for the first type of user device; and retrieving the stored type of the user device.

The webserver may be an out-of-band webserver.

The method may include sending a response to a web browser of the user device to create the device_checked cookie on the user device, if the device_checked cookie was determined not to exist on the user device, wherein the sending the response is based on instructions retrieved from the webpage designed for the first user device.

The method may include sending a request to a load balancer comprising instructions for the load balancer to send a response to a web browser of the user device to create the device_checked cookie on the user device, if the device_checked cookie was determined not to exist on the user device, wherein the sending the request to the load balancer is based on instructions retrieved from the webpage designed for the first user device.

The sending the request to the load balancer may be performed for each of a plurality of Internet domain names.

The method may include sending the webpage designed for the first type of user device to the user device.

A computer system for redirecting a webpage request for a webpage designed for a first type of user device to a webpage request for a corresponding webpage designed for a second type of user device is disclosed. The system includes a processor adapted to: receive the webpage request from a user device for the webpage designed for the first type of user device; determine whether a device_checked cookie exists for the user device, and if the device_checked cookie does not exist, then modifying the received request for the webpage designed for the first type of user device to include a type of the user device, wherein the device_checked cookie indicates the type of the user device; retrieve instructions from the webpage designed for the first user device; and send a response to the user device to redirect to the webpage designed for the second type of device if the type of the user device indicates the user device is more compatible with the webpage designed for the second type of device, wherein the sending the response is based on the instructions retrieved from the webpage designed for first user device.

A computer-readable medium encoded with a computer-executable program to perform a method for redirecting a webpage request for a webpage designed for a first type of user device to a webpage request for a corresponding webpage designed for a second type of user device is disclosed. The method may include receiving the webpage request from a user device for the webpage designed for the first type of user device; determining whether a device_checked cookie exists for the user device, and if the device_checked cookie does not exist, then modifying the received request for the webpage designed for the first type of user device to include a type of the user device, wherein the device_checked cookie indicates the type of the user device; retrieving instructions from the webpage designed for the first user device; and sending a response to the user device to redirect to the webpage designed for the second type of device if the type of the user device indicates the user device is more compatible with the webpage designed for the second type of device, wherein the sending the response is based on the instructions retrieved from the webpage designed for first user device.

It is to be understood that both the foregoing general description and the following detailed description are exemplary and explanatory and are intended to provide further explanation of the invention as claimed.

BRIEF DESCRIPTION OF THE DRAWINGS

The following detailed description can be read in connection with the accompanying drawings in which like numerals designate like elements and in which.

DETAILED DESCRIPTION

Figure 1:
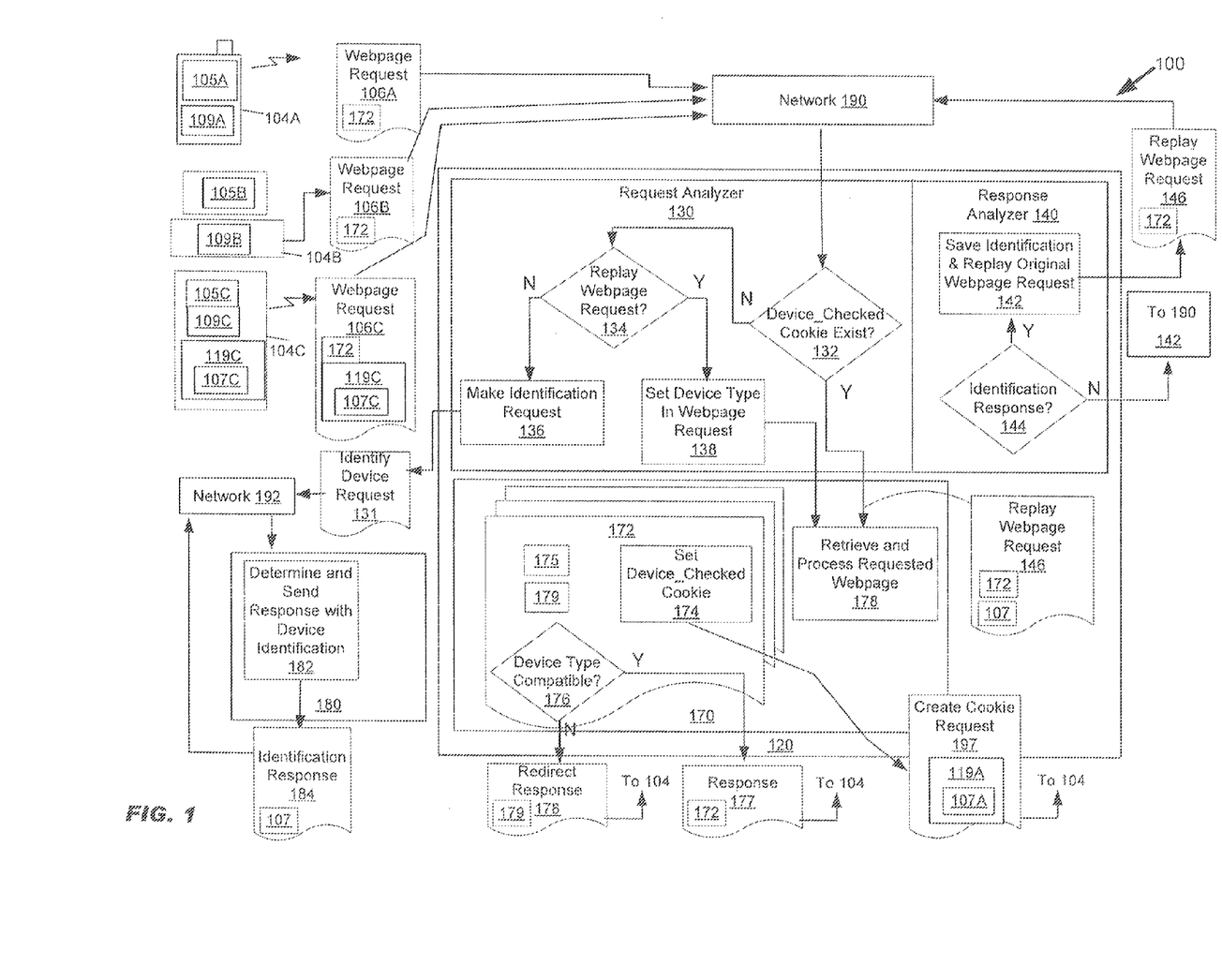
FIG. 1 is a schematic illustration of an embodiment of a system for redirecting a webpage request to a more compatible webpage.

FIG. 1 is a schematic illustration of an embodiment of a system for redirecting a webpage request to a more compatible webpage. The system for redirecting a webpage request to a more compatible webpage 100 ("system") includes server 120. Also illustrated in FIG. 1 are a mobile device 104A, desktop computer 104A, a tablet computer 104C, network 190, network 192, and webserver 180, which, in embodiments, is part of the system 100. The server 120 receives a webpage request 106 from a user device 104 having a user type 109 for a webpage 172 designed for a first type of user device, and determines whether or not to send a response 178 to the user device 104 to redirect to a webpage 179 designed for a second type of user device based on whether or not the webpage designed for the second type 179 of user device is more compatible with the user device 104.

The network 190 may be the Internet, an intranet, extranet, or other type of communication means that enables two or more user devices 104 to communicate with one another. The network 192 may be an intranet that enables the server 120 and the webserver 180 to communicate with one another and where the communication traffic is not be exposed to the Internet.

The user device 104A is a mobile device 104A. The mobile device 104A includes a browser 105A. The browser 105A may be a browser 105A that is suitable for both desktop computer 105B and mobile device 105A, or a browser 105A that is configured for the mobile device 104A. The browser 105A may be a browser such as Internet Explorer™, Firefox™, or Chrome™. The browser 105A is configured to send requests to the server 120 and to receive responses from the server 120 via the network 190 using Hyper Text Transfer Protocol (HTTP). The mobile device 104A may be a mobile device 104A such as a smartphone. For example, an Android™ based Samsung™ smartphone or an Apple™ based iPhone™ smartphone.

User device 104B is a desktop computer 104B or a laptop computer 104B. User device 104C is a tablet computer 104C. Table computer 104C includes a device_checked cookie 119C and type 107C. The system 100 uses device_checked cookie 119C to store the type 107C of user device 104, for example, mobile device 104A, desktop computer 104B, or tablet computer 104C. Sometimes the features provided by browsers 105 is different according to the type of user device 104A, 104B, and 104C. For example, a browser 105A of a mobile device 104A may not include all the features of a browser 105B of a desktop computer 105B or all the features of a browser 105C of tablet computers 104C. Sometimes this can cause problems when a user (not illustrated) attempts to load a webpage 172 designed for a different type of user device 104 than the type of the user's device.

The server 120 includes request analyzer 130, response analyzer 140, and webserver system 170. The server 120 may be an appliance such as a BIG-IP® Local-Traffic Manager™. The webserver system 170 may be webserver software such as Apache™ running under Unix or Internet Information Services™ running under Windows™, which responds to requests 106 from the network 190 by sending out response 177, 178. The webserver system 170 may include a retrieve and process requested webpage 178, which is configured to respond to HTTP requests for webpages by retrieving the webpage and processing the commands in the webpage 172. The request analyzer 130 is configured to take actions and to analyze requests such as request 106 received by the server 120. The response analyzer 140 is configured to take actions and analyze responses such as responses 177, 178 that the server 120 is going to send. The request analyzer 130 and response analyzer 140 may be implemented using iRule™ which interacts with the webserver system 170.

The webserver 180 may be a computer that is configured with webserver software (not illustrated.) The webserver 180 may include determine and send response with device identification 182, which may be implemented in, for example, PHP™, which is a type of general-purpose server-side scripting language for dynamic webpages. It may use WURFL™, which is a HTTP client Device Description Repository, to perform the device identification.

In operation, the system 100 receives a request 106 from a user device 104 and sends back a response 177 or 178 to the request 106. Response 178 is an instruction for the user device 104A to redirect to a different webpage 179 that was designed for a more compatible type of user device 104. Response 177 is the actual webpage 172 requested by the user device 104. Response 177 may actually be many responses and requests to deliver the webpage 172 to the user device 104.

The following is a detailed example of the operation of an embodiment of the system 100. The mobile device 104A sends a webpage request 106A via the network 190 to the server 120. The server 120 receives the webpage request 106A. The request analyzer 130 then examines the webpage request 106A. The webserver system 170 may perform some processing on the webpage request 106A prior to the request analyzer 130 examining the webpage request 106A depending on the particular configuration of the server 120.

At 132 the request analyzer 130 determines whether or not there is a device_checked cookie 107. The device_checked cookie 107 may be part of the webpage request 106. As illustrated, webpage request 106C includes the device_checked cookie 107, but webpage requests 106A, 106B do not include the device_checked cookie 107. The first time the mobile device 104A sends a webpage request 106A there will not be a device_checked cookie 107. Webpage request 106A does not include a device_checked cookie 107, so "Device_Checked Cookie Exist?" is "N", and the request analyzer 130, then checks to see if the webpage request 106A is a "Replay Webpage Request" at 134. In this case, the webpage request 106A is not a "Replay Webpage Request" 146, so the request analyzer 130 then goes to 136, "Make Identification Request." Here, the request analyzer 130 makes an out-of-band request to another webserver 180 by sending an "Identify Device Request" 131 to the webserver 180 via network 192. In embodiments, the "Make Identification Request" at 136 may be performed on the server 120. In embodiments, the webserver 180 is not an out-of-band webserver 180. In embodiments, the advantage of making the "Identify Device Request" 131 to a webserver 180 that is "out of band" is that the webserver 180 may need to run identification software that may be vulnerable to hacking and the identification software may slow down a server 120 that needs to respond to many webpage requests 106.

The webserver 180 receives the identify device request 131. The webserver 180 at 182 performs the following "Determine and send response with device identification" in response to instructions that are part of the identify device request 131. The webserver 180 sends the identification response 184 to the server 120 via the network 192. The identification response 184, which includes the type 107 of user device 104, is then analyzed by the response analyzer 140. At 144 the response analyzer 140 tests to see if the identification response 184 is an "identification response?" 184, and determines that it is an identification response 184. "Save Identification & Replay Original Webpage Request" 142 is then performed. The identification of the type 107 of the mobile device 104A is saved on the server 120, and the replay webpage request 146 is sent to the server 120. Here the type 107 is simply going to be mobile device. The original webpage request 106A may have been saved by the request analyzer 130 in conjunction with the "make identification request" 136, and the response analyzer 140 may then retrieve the original webpage request 106A and then resend it as the replay webpage request 146.

The server 120 receives the replay webpage request 146. The request analyzer 130 then determines that the "device_checked_cookie exist?" at 132 is still no. And, then at 134 the request analyzer 130 determines that this is a "replay webpage request?", so the "Y" is followed to "Set device type in webpage request" at 136. The request analyzer 130 then takes the stored type 107 and modifies the replay webpage request 146 to include the type 107.

In embodiments, the type 107 may be the device_checked cookie 119 which may be stored in the header of an HTTP webpage request 146. As illustrated, the tablet computer 104C already has the device_checked cookie 119C which includes the type of the device 107C, which here is a table computer 104C. When the tablet computer 104C sends a request to the server 120 it includes the device_checked cookie 119 in the header of the hyper text mark-up (HTTP) language, which includes the type of user device 107C.

The webserver system 170 then retrieves and processes the webpage 172 indicated in the replay webpage request 146 at 178 "Retrieve and Process Requested Webpage." The webpage 172 includes instructions "set device_checked cookie" 174 and "device type compatible?" 176, and may include a "designed for type of device" 175, which is an indication of which types of devices the webpage 172 was designed for and other information regarding flow compatible the webpage 172 is for different types of user devices 104. For example, designed for type of device 175 may include information such as "incompatible for mobile devices," "designed for mobile devices," "designed for tablet device, compatible with mobile and desktop devices," "designed for desktop devices, compatible with mobile and table devices," or "designed for tablet devices, and incompatible for mobile devices."

The webserver system 170 may retrieve instructions 174 "set device_checked cookie," and set the device_checked cookie 119. The device_checked cookie 119 may, in embodiments, be set by sending a create cookie request 197 to the web browser 105A on the mobile device 105A, which instructs the web browser 105A to store the device_checked cookie 119A, which includes the type 107A, in a place accessible to the web browser 105A, which may be on a local storage of the mobile device 105A. In embodiments, the web browser 105A will then include device_checked cookie 119A in the header of the next webpage request 106A to the server 120, so that "device_checked cookie exist?" at 132 will be "Yes" for the next webpage request 106A from the mobile device 104A. The tablet computer 104C has the device_checked cookie 119C while the mobile device 104A and the desktop computer 104B do not.

The webserver system 170 may at 176 determine whether or not the webpage 172 is compatible with the mobile device 104 based on the "designed for type of device" 175 and type 107. If the "device type compatible?" 176 indicates that the webpage 172 is not compatible with the mobile device 104, then the webserver system 170 sends a redirect response 178 to the mobile device 104. In embodiments, the instructions for "device type compatible?" 176 will instruct the webserver system 170 to determine whether or not there is a more compatible corresponding webpage 172 for the mobile device 104, and redirect the mobile device 104A to the more compatible webpage 179, which may have been designed for the mobile device 104A. In embodiments, the webserver system 170 will not redirect the mobile device 104A if a user (not illustrated) of the mobile device 104A has indicated that they do not want to be redirected. In embodiments, the webserver system 170 will redirect the mobile device 104A to a more compatible webpage 179 such as a homepage for mobile devices 104A if there is not a corresponding compatible webpage 179 and the webpage 172 is not compatible with the mobile device 104A.

The redirect response 178 is received by the web browser 105A of the mobile device 104A. The web browser 105A in response to receiving the redirect response 178, redirects the web browser 105A to an alternative webpage 179 that is more compatible with the mobile device 104A by sending a webpage request 106A with the requested webpage being 179 rather than 172. In embodiments, the alternative webpage 179 includes information that indicates which types of user devices 104 the alternative webpage 179 is compatible with.

In embodiments, the webserver system 170 determines whether or not the webpage 172 is appropriate for the mobile device 104A based on the "designed for type of device 175," type 107, and alternative webpage 179. For example, the webserver 170 may determine that the mobile device 104A is a mobile device 104 based on the type 107, "designed for type of device" 175, and "alternative webpage" 179. The designed for type of device 175 may indicate that the webpage 172 was designed for a desktop computer 104B, the type 107 may indicate that the device requesting the webpage 172 is a mobile device 104A, and the alternative webpage 179 may indicate that an alternative webpage exists that was designed for tablets computers 104C. The webserver system 170 may based on this information determine that the redirect response 178 should be sent to the mobile device 104A because the alternative webpage 179 is more compatible with the mobile device 104A than the requested webpage 172.

Thus the system 100 provides a system 100 to redirect a webpage request 106A for a webpage 172 designed for a first type of user device to a more compatible web page 179 designed for a second type of user device.

Figure 2:
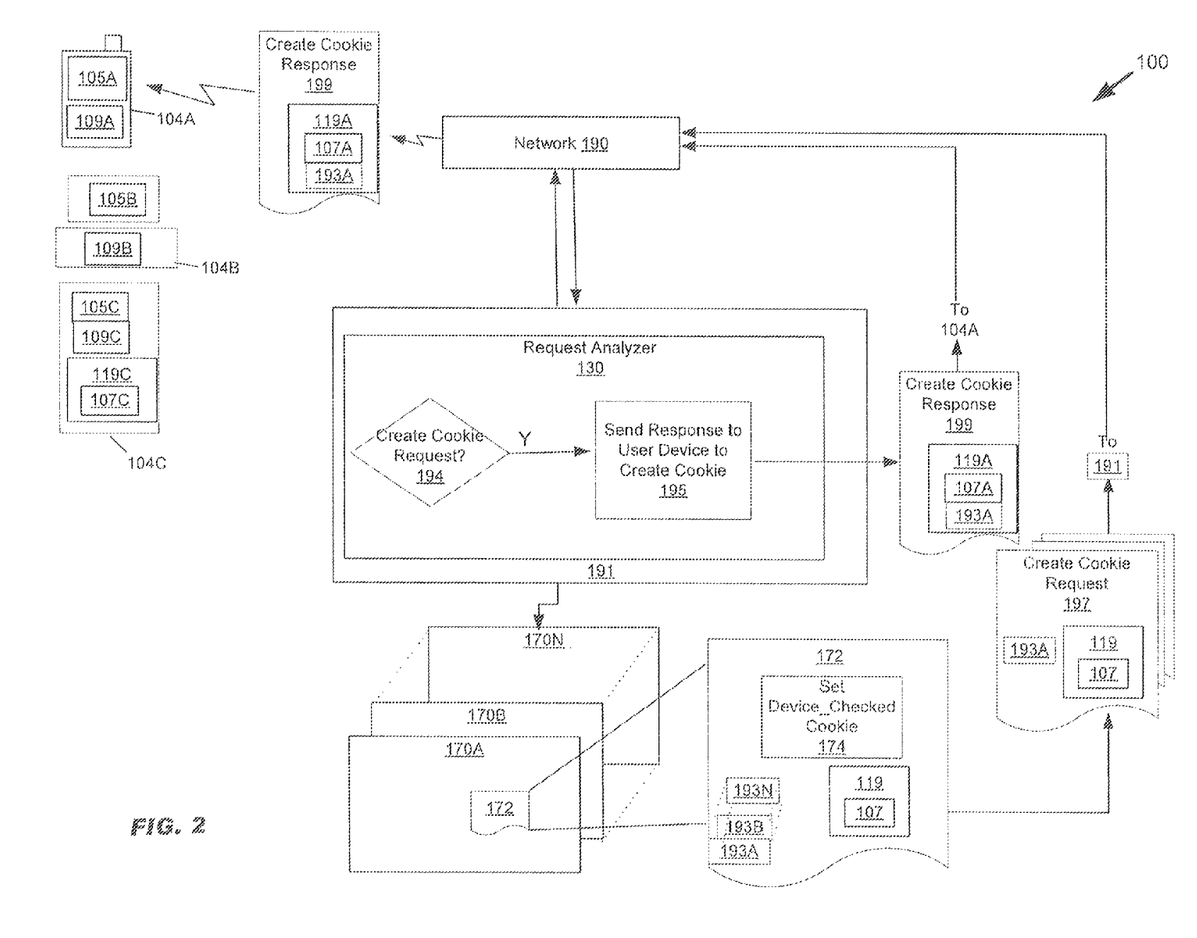
FIG. 2 is a schematic illustration of an embodiment of a system for redirecting a webpage request to a more compatible webpage.

FIG. 2 is a schematic illustration of an embodiment of a system for redirecting a webpage request to a more compatible webpage. The system 100 includes webservers 170A, 170B, . . . , 170N, and, load manager 191. Also illustrated in FIG. 2 are a mobile device 104A, desktop computer 104B, tablet computer 104C, and network 190. The webserver 170A determines that the device_checked cookie 119 needs to be set for the mobile device 104A and sends requests to the load manager 191 to create the device_checked cookie 119 for each domain 193 for the mobile_device 104A.

The load manager 191 manages load of user devices 104 by assigning user devices 104 to particular webservers 170A, 170B, . . . , 170N. In this way, multiple webservers 170 may be used to service the user devices 104. Additionally, the load manager 191 may manage multiple domain names.

A particular server 120 may not be able to create a device_checked cookie 119 for each of the domain names 193 that the load manager 191 is managing. In the embodiment illustrated in FIG. 2, when a webserver 170A, as illustrated, determines that the device_checked cookie 119 needs to be created on the user device 104A the webserver 170A sends a create cookie request 197 to the load manager 191 indicating that a device_checked cookie 119 should be created on the user device 104A for domain 193A, as illustrated.

The load manager 191 receives the create cookie request 197. The request analyzer 130 then determines that this is a create cookie request at 194. The request analyzer 130 then sends a create cookie response 199 to user device 104 to create a cookie for a device_checked cookie 119A with type 107A for domain 193A. The browser 105A of the user device 104A then creates the device_checked cookie 119A for the domain 193A. In embodiments, the domain 193 is implicitly part of create cookie response 199 as the create cookie response 199 may be generated using the domain 193 by the request analyzer 130. In embodiments, the create cookie request 197, and/or the request analyzer 130 may include in the create cookie response 199 an indication that the device_checked cookie 119 should be active for only a specified period of time such as one hour or one week. The advantage of keeping the device_checked cookie 119 active for only a specified period of time is that the Internet Protocol (IP) address associated with the user device 104 may switch to a different user device 104 so the type of device of the user device 104 should be periodically determined.

In embodiments, the create cookie request 197 is a request to download a cascading style sheet which the request analyzer 130 determines is a create cookie request 197.

Figure 3:
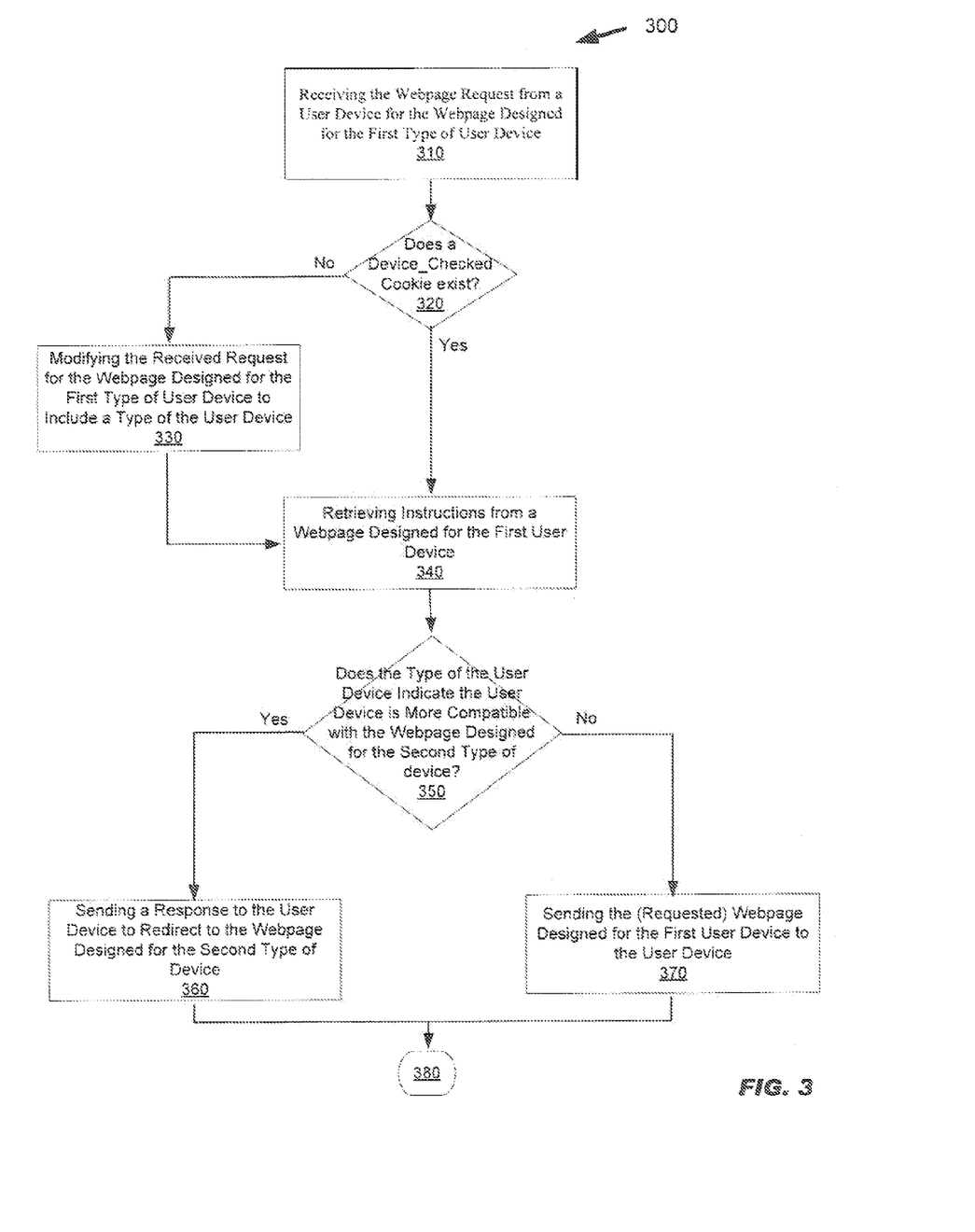
FIG. 3 illustrates an embodiment of a method of redirecting a webpage request for a webpage designed for a first type of user device to a webpage request for a corresponding webpage designed for a second type of user device.

FIG. 3 illustrates an embodiment of a method of redirecting a webpage request for a webpage designed for a first type of user device to a webpage request for a corresponding webpage designed for a second type of user device.

The method 300 may begin at 310 with receiving the webpage request from a user device for the webpage designed for the first type of user device. For example, as discussed in connection with FIG. 1, user device 104A may send a webpage request 106A for webpage 172. The method may continue at 320 with does a device_checked cookie exist? For example, the server 120 may determine whether or not a device_checked cookie 119 is included in the header of the webpage request 106A. The method may continue at 330 with, if the device_checked cookie does not exist, modifying the received request for the webpage designed for the first type of user device to include a type of the user device. For example, the server 120 may modify the replay webpage request 146 to include type 107 of the user device 104A. Alternatively, if the device_checked cookie does exist then the method proceeds directly to step 340. For example, if webpage request 106C were received by server 120 then the webpage request 106C would be passed to the webserver system 170 without modification because webpage request 106C includes the type 107.

The method continues at 340 with retrieving instructions from the webpage designed for the first user device. For example, webserver system 170 may retrieve instructions 174, 175, 176, and 179.

The method continues at 350 with does the type of user device indicate the user device is more compatible with a webpage designed for the second type of device? An example of a "Yes" would be, as illustrated in FIG. 1, an indication in "designed for type of device" 175 that the webpage 172 was designed for a desktop computer 104B, and that there was a corresponding webpage 179 designed for mobile devices 104A. In this case, the method would proceed to step 360 with sending a response to the user device to redirect to the webpage designed for the second type of device if the type of the user device indicates the user device is more compatible with the webpage designed for the second type of device. For example, the webserver system 170 may send redirect response 178 that includes an alternative page 179 that may be a corresponding page that is more compatible for the mobile device 104A. Alternatively, the method would proceed to step 370 if there was not a more compatible webpage 179 for the user device 104. For example, in FIG. 1, if the desktop computer 104B had requested the webpage 172, then the webserver system 170 would send the requested webpage 172 designed for the first user device to the user device 104B, which is simply responding to the webpage request 106B. The method 300 may end at 380.

Embodiments of the invention have the advantage that mobile devices that are accessing web pages that are not appropriate for mobile devices can be redirected to web pages that are appropriate for mobile devices. The mobile devices can be redirected to the equivalent mobile page and not directed to an index page or home page for mobile devices. This may prevent the user of the mobile device from becoming frustrated by having to navigate from a home page down to an equivalent of a specific page the user had just tried to access.

Embodiments of the invention require little overhead and thus may not require additional hardware to be purchased to service the users accessing the web pages.

The modules described in connection with embodiments disclosed herein may be implemented where the number of modules is different with the functionality of described herein divided between fewer or more modules.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium, which may be in a physical form.

Although described in connection with preferred embodiments thereof, it will be appreciated by those skilled in the art that additions, deletions, modifications, and substitutions not specifically described may be made without departure from the spirit and scope of the invention as defined in the appended claims.

What is claimed is:

1. A method of redirecting a webpage request for a webpage designed for a first type of user device to a webpage request for a corresponding webpage designed for a second type of user device, the method comprising:
    in response to receiving the webpage request from a user device for the webpage designed for the first type of user device,
        determining whether a device_checked cookie exists for the user device, and if the device_checked cookie does not exist, then modifying the received request for the webpage designed for the first type of user device to include a type of the user device, wherein the device_checked cookie indicates the type of the user device;
        retrieving instructions by a server that are contained within and originate from the webpage designed for the first type of user device, wherein the instructions include an instruction to set the device_checked cookie for the user device, an instruction to determine whether the webpage designed for the first type of user device is compatible with the user device, and an indication of one or more types of user devices for which the webpage designed for the first type of user device is designed;
    sending a request to the user device to store the device_checked cookie according to the instruction to set the device_checked cookie for the user device;
    determining whether the webpage designed for the first type of user device is compatible with the user device using the indication of one or more types of user devices for which the webpage designed for the first type of user device is designed and the type of the user device, according to the instruction to determine whether the webpage designed for the first type of user device is compatible with the user device; and
    sending a response to the user device to redirect to the webpage designed for the second type of user device if the type of the user device indicates the user device is more compatible with the webpage designed for the second type of user device, wherein the sending the response is triggered by the instructions retrieved from the webpage designed for the first type of user device.

2. The method of claim 1, wherein the retrieved instructions from the webpage designed for the first user device comprise instructions to send a response to the user device to redirect to the webpage designed for the second type of user device if the type of the user device indicates the user device is more compatible with the webpage designed for the second type of user device.

3. The method of claim 1, wherein sending a response comprises:
    sending a response to the user device to redirect to the webpage designed for the second type of user device if the type of the user device indicates the user device is more compatible with the webpage designed for the second type of device, and if a user of the user device has not indicated a preference for the webpage designed for the first type of user device.

4. The method of claim 1, wherein the first user device, the second user device, and the type of the user device are at least one of: a desktop computer, a laptop computer, a tablet computer, and a mobile device.

5. The method of claim 1, wherein modifying the request comprises:
    determining the type of the user device; and
    modifying the request for the webpage designed for the first type of user device to include the type of the user device.

6. The method of claim 5, wherein determining the type of the user device comprises:
    sending a request to a webserver for the type of the user device; and
    receiving a response from the webserver comprising the type of the user device.

7. The method of claim 6, further comprising after the step of receiving the response from the webserver:
    storing the received type of the user device;
    resending the request for the webpage designed for the first type of user device;

receiving the resent request for the webpage designed for the first type of user device; and retrieving the stored type of the user device.

8. The method of claim 6, wherein the webserver is an out-of-band webserver.

9. The method of claim 1, wherein:

sending the request to the user device to store the device_checked cookie is conditioned on whether the device_checked cookie is determined not to exist for the user device.

10. The method of claim 1, further comprising:

sending a request to a load balancer comprising instructions for the load balancer to send a response to a web browser of the user device to create the device_checked cookie on the user device, if the device_checked cookie was determined not to exist on the user device, wherein the sending the request to the load balancer is based on instructions retrieved from the webpage designed for the first type of user device.

11. The method of claim 10, wherein the sending the request to the load balancer is performed for each of a plurality of Internet domain names.

12. The method of claim 1, further comprising:

sending the webpage designed for the first type of user device to the user device.

13. A computer system for redirecting a webpage request for a webpage designed for a first type of user device to a webpage request for a corresponding webpage designed for a second type of user device, the system comprising:

a processor adapted to:

receive the webpage request from a user device for the webpage designed for the first type of user device;

determine whether a device_checked cookie exists for the user device, and if the device_checked cookie does not exist, then modify the received request for the webpage designed for the first type of user device to include a type of the user device, wherein the device_checked cookie indicates the type of the user device;

retrieve instructions by a server that are contained within and originate from the webpage designed for the first type of user device, wherein the instructions include an instruction to set the device_checked cookie for the user device, an instruction to determine whether the webpage designed for the first type of user device is compatible with the user device, and an indication of one or more types of user devices for which the webpage designed for the first type of user device is designed;

send a request to the user device to store the device-_checked cookie according to the instruction to set the device_checked cookie for the user device;

determine whether the webpage designed for the first type of user device is compatible with the user device using the indication of one or more types of user devices for which the webpage designed for the first type of user device is designed and the type of the user device, according to the instruction to determine whether the webpage designed for the first type of user device is compatible with the user device; and send a response to the user device to redirect to the webpage designed for the second type of user device if the type of the user device indicates the user device is more compatible with the webpage designed for the second type of user device, wherein the sending the response is triggered by the instructions retrieved from the webpage designed for the first type of user device.

14. The computer system of claim 13, wherein the retrieved instructions from the webpage designed for the first user device comprise instructions to send a response to the user device to redirect to the webpage designed for the second type of user device if the type of the user device indicates the user device is more compatible with the webpage designed for the second type of user device.

15. The computer system of claim 13, wherein sending the response comprises:

sending a response to the user device to redirect to the webpage designed for the second type of user device if the type of the user device indicates the user device is more compatible with the webpage designed for the second type of device, and if a user of the user device has not indicated a preference for the webpage designed for the first type of user device.

16. The computer system of claim 13, wherein the first user device, the second user device, and the type of the user device are at least one of: a desktop computer, a laptop computer, a tablet computer, and a mobile device.

17. The computer system of claim 13, wherein modifying the request comprises:

determining the type of the user device; and modifying the request for the webpage designed for the first type of user device to include the type of the user device.

18. The computer system of claim 17, wherein determining the type of the user device comprises:

sending a request to a webserver for the type of the user device; and receiving a response from the webserver comprising the type of the user device.

19. The computer system of claim 18, wherein determining the type of the user device further comprises, after the step of receiving the response from the web server:

storing the received type of the user device;

resending the request for the webpage designed for the first type of user device;

receiving the resent request for the webpage designed for the first type of user device; and retrieving the stored type of the user device.

20. The computer system of claim 18, wherein the web server is an out-of-band webserver.

21. The computer system of claim 13, wherein:

sending the request to the user device to store the device_checked cookie is conditioned on whether the device_checked cookie is determined not to exist for the user device.

22. The computer system of claim 13, wherein the processor is further adapted to: send a request to a load balancer comprising instructions for the load balancer to send a response to a web browser of the user device to create the device_checked cookie on the user device, if the device_checked cookie was determined not to exist on the user device, wherein the sending the request to the load balancer is based on instructions retrieved from the webpage designed for the first type of user device.

23. The computer system of claim 22, wherein the sending the request to the load balancer is performed for each of a plurality of Internet domain names.

24. The computer system of claim 13, wherein the processor is further adapted to:

send the webpage designed for the first type of user device to the user device.

25. A non-transitory computer-readable medium encoded with a computer-executable program to perform a method for redirecting a webpage request for a webpage designed for a first type of user device to a webpage request for a corresponding webpage designed for a second type of user device, the method comprising:

receiving the webpage request from a user device for the webpage designed for the first type of user device;

determining whether a device_checked cookie exists for the user device, and if the device_checked cookie does not exist, then modifying the received request for the webpage designed for the first type of user device to include a type of the user device, wherein the device_checked cookie indicates the type of the user device;

retrieving instructions by a server that are contained within and originate from the webpage designed for the first type of user device, wherein the instructions include an instruction to set the device_checked cookie for the user device, an instruction to determine whether the webpage designed for the first type of user device is compatible with the user device, and an indication of one or more types of user devices for which the webpage designed for the first type of user device is designed;

sending a request to the user device to store the device_checked cookie according to the instruction to set the device_checked cookie for the user device;

determining whether the webpage designed for the first type of user device is compatible with the user device using the indication of one or more types of user devices for which the webpage designed for the first type of user device is designed and the type of the user device, according to the instruction to determine whether the webpage designed for the first type of user device is compatible with the user device; and sending a response to the user device to redirect to the webpage designed for the second type of user device if the type of the user device indicates the user device is more compatible with the webpage designed for the second type of user device, wherein the sending the response is triggered by the instructions retrieved from the webpage designed for the first type of user device.

26. The medium of claim 25, wherein the retrieved instructions from the webpage designed for the first user device comprise instructions to send a response to the user device to redirect to the webpage designed for the second type of user device if the type of the user device indicates the user device is more compatible with the webpage designed for the second type of user device.

27. The medium of claim 25, wherein sending the response comprises:

sending a response to the user device to redirect to the webpage designed for the second type of user device if the type of the user device indicates the user device is more compatible with the webpage designed for the second type of device, and if a user of the user device has not indicated a preference for the webpage designed for the first type of user device.

28. The medium of claim 25, wherein the first user device, the second user device, and the type of the user device are at least one of: a desktop computer, a laptop computer, a tablet computer, and a mobile device.

29. The medium of claim 25, wherein modifying the request comprises:

determining the type of the user device; and modifying the request for the webpage designed for the first type of user device to include the type of the user device.

30. The medium of claim 29, wherein determining the type of the user device comprises:

sending a request to a webserver for the type of the user device; and receiving a response from the webserver comprising the type of the user device.

31. The medium of claim 30, the method further comprising after the step of receiving the response from the webserver:

storing the received type of the user device;

resending the request for the webpage designed for the first type of user device;

receiving the resent request for the webpage designed for the first type of user device; and retrieving the stored type of the user device.

32. The medium of claim 30, wherein the webserver is an out-of-band webserver.

33. The medium of claim 25, wherein:

sending the request to the user device to store the device_checked cookie is conditioned on whether the device_checked cookie is determined not to exist for the user device.

34. The medium of claim 25, the method further comprising:

sending a request to a load balancer comprising instructions for the load balancer to send a response to a web browser of the user device to create the device_checked cookie on the user device, if the device_checked cookie was determined not to exist on the user device, wherein the sending the request to the load balancer is based on instructions retrieved from the webpage designed for the first type of user device.

35. The medium of claim 34, wherein the sending the request to the load balancer is performed for each of a plurality of Internet domain names.

36. The medium of claim 25, the method further comprising:

sending the webpage designed for the first type of user device to the user device.

* * * * *